(12) United States Patent
Joseph et al.

(10) Patent No.: US 7,231,519 B2
(45) Date of Patent: Jun. 12, 2007

(54) SECURE INTER-NODE COMMUNICATION

(75) Inventors: Doug Joseph, Danbury, CT (US);
Thomas D. Lovett, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 890 days.

(21) Appl. No.: 09/876,351

(22) Filed: Jun. 6, 2001

(65) Prior Publication Data
US 2002/0188865 A1 Dec. 12, 2002

(51) Int. Cl.
*H04L 9/00* (2006.01)
(52) U.S. Cl. ......................... 713/171; 726/21
(58) Field of Classification Search ........ 380/278–279, 380/283–285; 713/171; 726/11–13, 21
See application file for complete search history.

(56) References Cited

U.S. PATENT DOCUMENTS

| | | | | |
|---|---|---|---|---|
| 4,843,541 A | * | 6/1989 | Bean et al. | 710/36 |
| 5,530,758 A | * | 6/1996 | Marino et al. | 713/150 |
| 5,802,058 A | | 9/1998 | Harris et al. | |
| 5,802,065 A | * | 9/1998 | Ogawa et al. | 370/469 |
| 5,825,890 A | * | 10/1998 | Elgamal et al. | 713/151 |
| 5,845,331 A | * | 12/1998 | Carter et al. | 711/163 |
| 5,878,128 A | | 3/1999 | Kantola | |
| 6,141,755 A | | 10/2000 | Dowd et al. | |
| 6,161,139 A | * | 12/2000 | Win et al. | 709/225 |
| 6,178,244 B1 | * | 1/2001 | Takeda et al. | 380/277 |
| 6,611,498 B1 | * | 8/2003 | Baker et al. | 370/252 |
| 2001/0055380 A1 | * | 12/2001 | Benedyk et al. | 379/219 |

OTHER PUBLICATIONS

Stein (Lincoln D. Stein, "Web Sercurity, a step-by-step reference guide", 1998, ISBN: 0201634899).*
Fontana (John Fontana, Defending against Outlook viruses, http://www.networkworld.com/archive/2000/99914_07-03-2000.html, Jul. 3, 2000).*
Pfleeger (Charles P. Pfleeger, "Security in computing", 2nd edition, 1996, ISBN: 0133374866) p. 302-303.*
Minasi (Mark Minasi, Mastering Windows NT Server 4, 6th edition, 1999, ISBN: 0782124453)p. 1 and 8, Minasi, p. 1050-1052.*
winnt40serv (http://www.guidebookgallery.org/screenshots/winnt40serv).*
Microsoft Press, (Microsoft Internet Infomration Server Resource Kit, ISBN 1572316381, 1998), p. 1, 8 and 359.*
Hadfield et al. (Lee Hadfield, Dave Hater, Dave Bixler, "Windows NT Server 4 Security Handbook", 1997, ISBN: 078971213), Fig. 3.4, p. 76.*

(Continued)

*Primary Examiner*—Kambiz Zand
*Assistant Examiner*—Peter Poltorak
(74) *Attorney, Agent, or Firm*—Abdy Raissinia

(57) ABSTRACT

Secure inter-node communication is disclosed. The hardware of the first node sends a key, identification of the first node, and identification of a second node to hardware of the second node. The hardware of the second node receives the key and the identifications. The hardware of the second node verifies the identifications of the first and the second nodes, and stores the key. The key stored in the hardware of the first and the second nodes allows for a secure transmission channel from the software of the first node to software of the second node.

12 Claims, 4 Drawing Sheets

OTHER PUBLICATIONS

Pfleeger (Charles P. Pfleeger, "Security in computing", 2nd edition, 1996, ISBN: 0133374866), p. 22-23, 131-134, 300-302, 429-430.*

Kernel Extensions and Device Support Programming Concepts, http://publib16.boulder.ibm.com, accessed and printed on Aug. 31, 2005.

Application Architecture, http://www.lc.leidenuniv.nl, copyright 1996, 2002.

Kernel Mode Linux: Execute User Processes in Kernel Mode, http://web.yl.is.s.u-tokyo.ac.jp/~tosh, copyright 2002.

* cited by examiner

FIG 4

| CHANNEL KEY TABLE (SW) 400 | |
|---|---|
| ENTRY 402a | KEY 404a |
| ENTRY 402b | KEY 404b |
| . . . | . . . |
| ENTRY 402n | KEY 404n |

FIG 3

| CHANNEL STATE TABLE (SW) 300 | | | |
|---|---|---|---|
| ENTRY 302a | LOCAL EPID 304a | REMOTE PID 306a | REMOTE EPID 308a |
| ENTRY 302b | LOCAL EPID 304b | REMOTE PID 306b | REMOTE EPID 308b |
| . . . | . . . | . . . | . . . |
| ENTRY 302n | LOCAL EPID 304n | REMOTE PID 306n | REMOTE EPID 308n |

SECURE INTER-NODE COMMUNICATION

BACKGROUND OF THE INVENTION

1. Technical Field

This invention relates generally to inter-node communication, such as communication between processes of different partitions of one or more servers, and more particularly to such communication that is secure in nature.

2. Description of the Prior Art

Servers are used in a wide variety of different computing applications. A server generally is a computer on a network that is accessible by a number of client computers also on the network. Servers are used for Internet web applications, data storage applications, data mining applications, as well as other types of computing applications. As used herein, a node can be a server, but is not limited to a server. For example, a node may refer to a partition of a server.

Because servers may need to be upgraded as their processing requirements grow, some servers are scalable. A scalable server is one that can be upgraded to handle greater amounts of processing. For instance, a scalable server may be able to have its number of processors increased as necessary.

A server, such as a scalable server, may be partitioned into different operating system instances. Each operating system instance is logically a different virtual computer running in a separate partition, or domain, of the server, and is separate from the other operating system instances. The operating system instances may run the same or different operating systems, such as UNIX, LINUX, MICROSOFT WINDOWS NT, as well as other types of operating systems.

Each operating system instance usually can have a number of different processes running on it, such as user processes, kernel processes, and other types of processes. A kernel is a fundamental part of the operating system that provides basic services to the user processes. Each process may be a separate application program, instances of a number of different types of application programs, and so on. The processes run in separate parts of the partition referred to as user spaces. As used herein, the software of a node can be a process running in a partition, but is not limited to a process running in a partition.

Processes in different partitions may find it necessary to communicate with one another, to exchange data, and for other purposes. In some types of servers, each partition has an associated kernel agent that is responsible for allowing user processes of its partition to communicate with user processes of other partitions. Agents are routines that run in the background, and perform actions as needed.

A server may have a number of potential communication end points that allow the processes of its partitions to communicate with the processes of partitions of the same or other servers. The communication end points may be statically or dynamically allocated among the server's different partitions. When a process wishes to communicate with a process of a different partition, it receives temporary use of a communication end point for this purpose, assuming one is available.

A virtual communication channel is therefore established between a communication end point of one partition and a communication end point of another partition. Each communication end point corresponds to a user or kernel process of a partition. A difficulty is that the virtual communication channel is desirably secure. That is, the kernel agents of the various partitions may not a priori trust one another. To ensure the stability and security of the partition, however, a kernel agent should be able to restrict connections to only those end points in other partitions that it has authorized. Furthermore, the kernel agent must ensure that malicious or corrupt kernel agents of other partitions are not able to pretend that they have received authorization to establish a channel.

A limited solution to this difficulty is the use of a hypervisor. A hypervisor is a facility that typically runs in large enterprise servers for providing and managing multiple virtual computers, or operating system instances, running in partitions. The hypervisor is inherently trusted by all user processes and kernel agents. However, where the hypervisor runs on a remote processor or server, having all communications run through the hypervisor results in degraded performance of inter- process communications. Furthermore, many types of computers, such as those using INTEL PENTIUM-class processors, do not have the necessary capability to run a hypervisor.

Another limited solution is to have a single trusted communication channel created among all the partitions when they are first configured. The kernel agents can use this channel to send authorized messages to one another, for the purpose of establishing virtual channels between partitions. However, this solution does not prevent malicious or corrupt agents from pretending that they have received authorization to establish a channel. Furthermore, it forces kernel intervention for all communication calls.

For these described reasons, as well as other reasons, there is a need for the present invention.

SUMMARY OF THE INVENTION

The invention relates to secure inter- node communication. A method of the invention sends a key, identification of a first node, and identification of a second node from hardware of the first node to hardware of the second node. The hardware of the second node receives the key and the identifications of the first and the second nodes. The hardware of the second node then verifies the identifications of the first and the second nodes, and stores the key. The key stored in the hardware of the first and the second nodes allows for a secure transmission channel to the software of the first node from software of the second node.

A computerized system of the invention includes first and second connection management mechanisms. The first mechanism is at a first node, and maintains first keys for secure communication to first processes running in one or more first partitions of the first node from second processes running in one or more second partitions of a second node. The first keys are inaccessible by the first processes. Each first key is used for secure communication to one of the first processes from one of the second processes. Similarly, the second mechanism is at the second node, and maintains second keys for secure communication to the second processes from the first processes. The second keys are inaccessible by the second processes, and each second key is used for secure communication to one of the second processes from one of the first processes.

An article of manufacture of the invention includes a computer-readable signal-bearing medium and means in the medium. The means is for maintaining keys for secure communication to first processes running in one or more first partitions of a first node from second processes running in one or more second partitions of a second node. The keys are inaccessible by the first processes. Each key is used for secure communication to one of the first processes from one of the second processes.

Other features and advantages of the invention will become apparent from the following detailed description of the presently preferred embodiment of the invention, taken in conjunction with the accompanying drawings.

BRIEF DESCRIPTION OF THE DRAWINGS

FIG. 3 is a diagram of an example channel state table in conjunction with which embodiments of the invention may be implemented.

FIG. 4 is a diagram of a key channel table according to an embodiment of the invention.

DESCRIPTION OF THE PREFERRED EMBODIMENT

Overview

Figure 1:
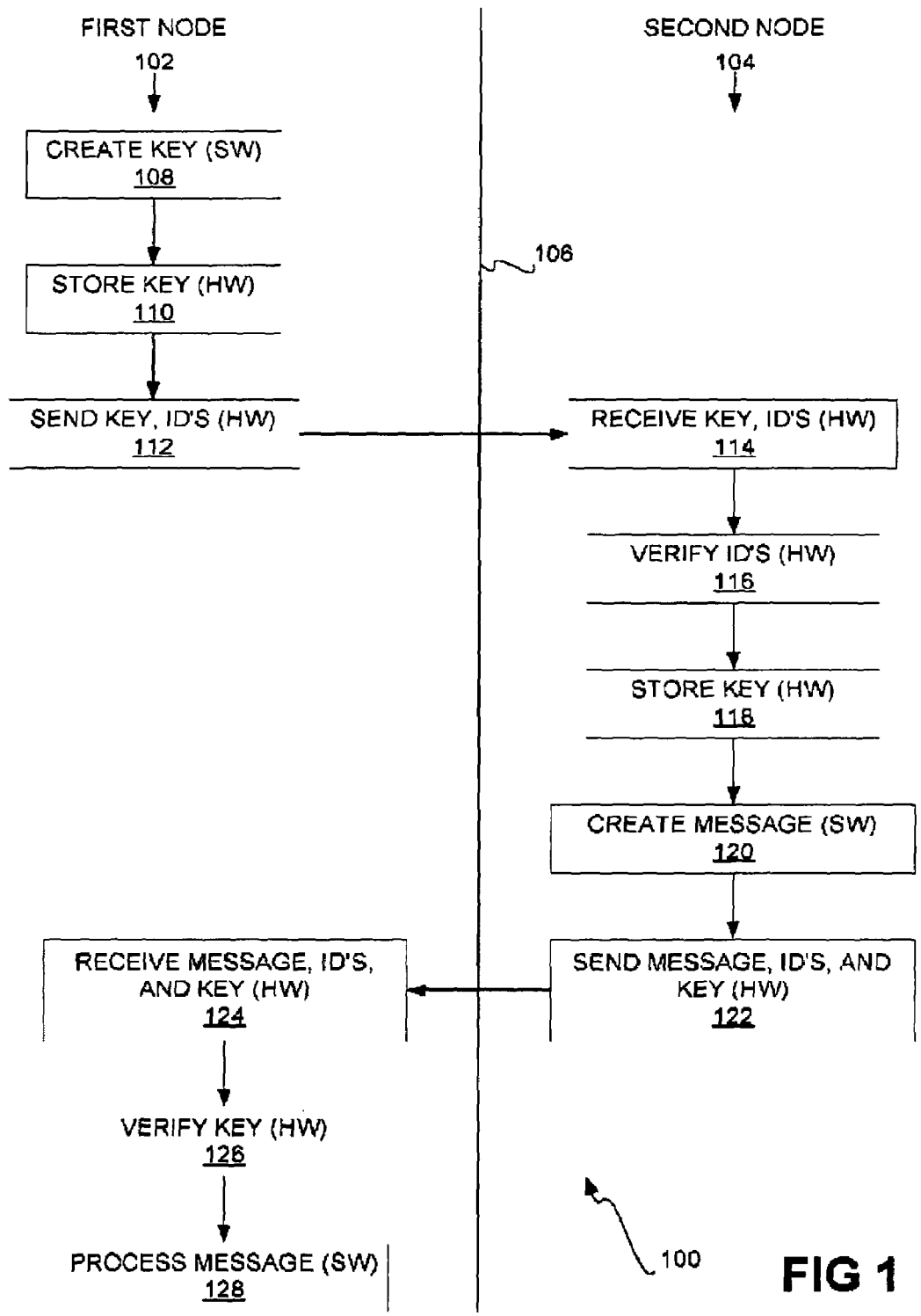
FIG. 1 is a flowchart of a method according to a preferred embodiment of the invention, and is suggested for printing on the first page of the issued patent.

In the preferred embodiment of the invention, a secure communication channel between a first node and a second node is established and used for transmitting messages as shown in the method 100 of FIG. 1. The columns 102 and 104 are separated by a line 106. The parts of the method 100 in the column 102 are performed at the first node, whereas the parts of the method 100 in the column 104 are performed at the second node. Each of the first and the second nodes may correspond to a different server, a different partition on the same server or different servers, and so on. The different parts of the method 100 in the column 102 may more specifically be performed by hardware or software of the first node, whereas the different parts of the method 100 in the column 104 may more specifically be performed by hardware or software of the second node.

The software of the first node first creates a channel key (108). This software may include a user process running on the node, a kernel agent of the node, or both the process and the agent. The channel key is transmitted, or written, by the software of the first node, such as through the kernel agent of the node, to the hardware of the first node, which stores the key (110). The hardware may be a connection management mechanism. The channel key is inaccessible by user processes of the first node, which are referred to generally as the software of the first node. The hardware of the first node then sends the key, identification of the first node, and identification of the second node to the hardware of the second node (112).

The identification of the first node preferably includes the identification of the first node itself, such as identification of the partition of the first node in which the software of the first node is running, as well as identification of the channel end point on the first node for which a connection is being authorized. This channel end point on the first node is associated with the user process of the first node, and thus with the software of the first node. The identification of the second node preferably includes identification of the channel end point on the second node for which a connection is being authorized. This channel end point on the second node is associated with a user process of the second node, and thus with the software of the second node.

The hardware of the second node then receives the channel key and the identifications of the first and the second nodes from the hardware of the first node (114). The hardware of the second node is also a connection management mechanism. The hardware of the second node verifies the identifications of the first and the second nodes (116). That is, the hardware verifies that the identifications of the first and the second nodes are consistent with a virtual communication channel that software of the second node has authorized to be established. This software may include a user process running on the node, a kernel agent of the node, or both the process and the agent. If the verification is acceptable, the hardware of the second node stores the channel key (118). The channel key is inaccessible by the software of the second node. In this way, a secure communication channel between the software of the first node and the software of the second node is established.

The secure communication channel that is established can be a unidirectional channel for communication from the software of the second node to software of the first node. The hardware of the second node sends a message from the software of the second node, as well as the identifications of the first and the second nodes and the channel key that was previously stored to the hardware of the first node (122). The identification of the first node in this case includes the identification of the partition in which the software is running and the identification of the channel end point on the first node. The identification of the second node includes the identification of the partition of the second node in which the software of the second node is running, and the identification of the channel end point on the second node.

The hardware of the first node receives the message, the identification of the first and the second nodes, and the channel key (124). The hardware of the first node verifies the channel key against the key that was previously stored (126). If verification is acceptable, the hardware of the first node stores the message for the software of the first node, which processes the message (128).

The channel key therefore provides a secure asynchronous communication between the software of the first and the second nodes. The hardware is inherently secure, and therefore stores the key in a way that the user processes of any node and kernel agents of remote nodes cannot access it. Because malicious or corrupt user processes and remote kernel agents do not have access to the channel key, they cannot negatively affect the security of the virtual channel. The channel key can be a guaranteed unique identifier (GUID), or another type of identifier.

Technical Background

Figure 2:
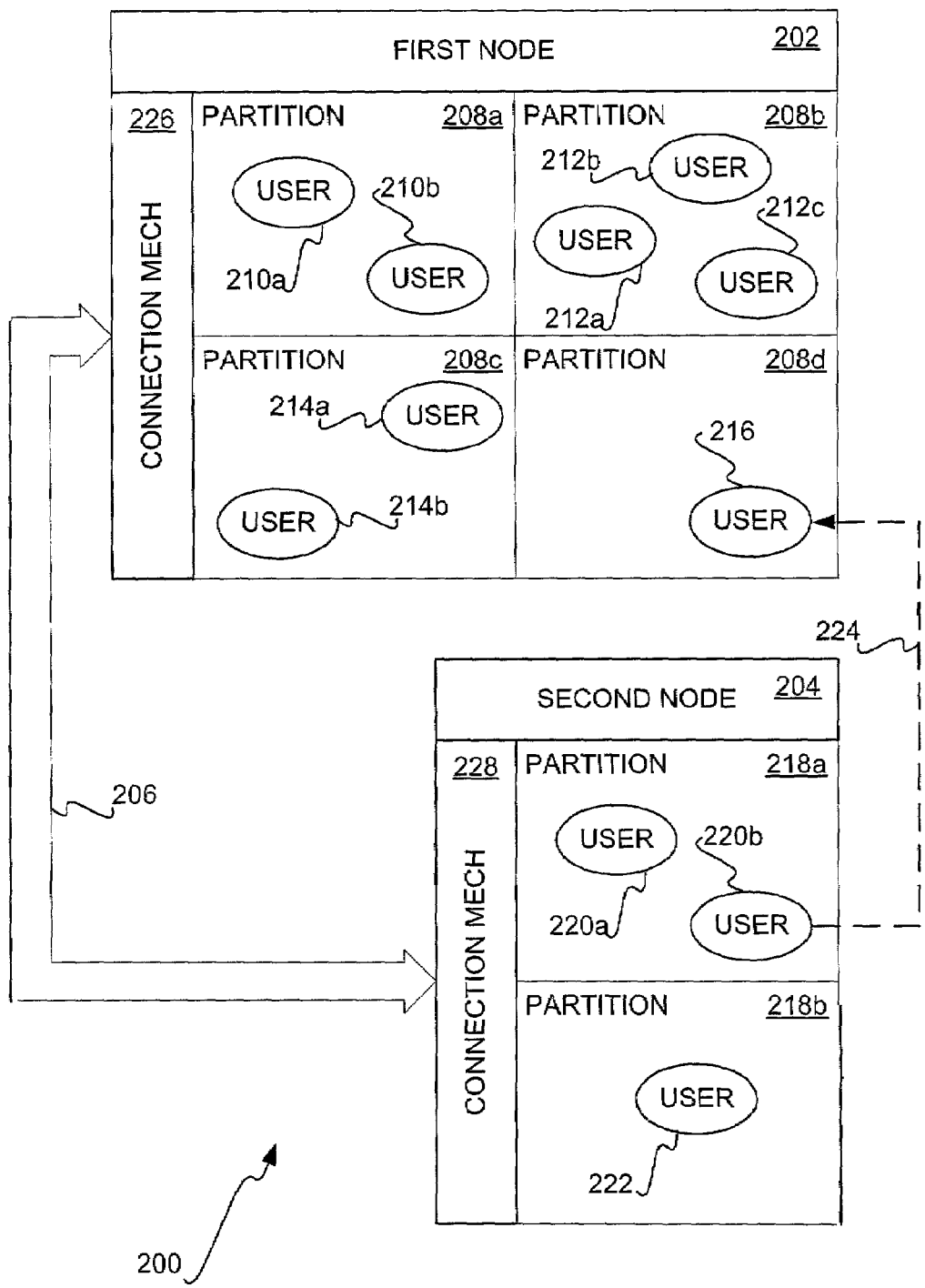
FIG. 2 is a diagram of an example two-node system in conjunction with which embodiments of the invention may be implemented.

FIG. 2 shows an example two-node system 200 in conjunction with which embodiments of the invention may be implemented. The first node 202 and the second node 204 correspond to different servers in the system 200, but they may also correspond to different partitions of the same server. While the system 200 includes a first node 202 and a second node 204, the invention itself may be implemented in conjunction with systems having fewer or greater numbers of nodes. For example, secure virtual communication channels may be established between user or kernel processes of different partitions of the same node, or between user or kernel processes of different partitions of three or more nodes.

The first node 202 and the second node 204 are connected to one another through a connection 206. The connection 206 may be a network, a bus, or another type of connection. More specifically, the connection management mechanism 226 connects to the connection management mechanism 228 via the connection 206. Each of the mechanisms 226 and 228 is hardware that is used to establish virtual communication channels between software of the first node 202 and software of the second node 204.

The first node 202 has partitions 208a, 208b, 208c, and 208d, whereas the second node 204 has partitions 218a and 218b. Each partition preferably corresponds to an operating system instance in which software, such as processes, can run. Each partition may also have a kernel agent that manages communication between the user processes of a partition of a node and the connection management mechanism of the node. With respect to the first node 202, the partition 208a has user processes 210a and 210b running therein, whereas the partition 208b has user processes 212a, 212b, and 212c running therein. The partition 208c has the user processes 214a and 214b running therein, and the partition 208d has the user process 216 running therein. With respect to the second node 204, the partition 218a has user processes 220a and 220b running therein, whereas the partition 218b has the user process 222 running therein. The number of processes in each partition and the number of partitions in each node is variable, and the actual number of each depicted in FIG. 2 is for example purposes only.

As shown in FIG. 2, the user process 216 of the partition 208d of the first node 202 wishes to establish a secure communication channel with the user process 220b of the partition 218a of the second node 204, such that the latter process 220b is able to securely send messages to the former process 216. The two user processes 216 and 220b initially exchange identification information, such as through kernel agents and the mechanisms 226 and 228. This information is stored by the processes in respective channel state tables of their partitions.

FIG. 3 shows an example channel state table 300 in conjunction with which embodiments of the invention may be implemented. The channel state table 300 is accessible by the local kernel agent, but not by any user process. The channel state table 300 has a number of entries 302a, 302b, . . . , 302n. Each entry includes at least a local end point identifier, a remote partition identifier, and a remote end point identifier. The local end point identifier is associated with a user process running in a partition that wishes to establish a secure channel. The remote partition identifier is the identification of the partition in which another user process with which the user process wishes to establish a secure channel is running, whereas the remote end point identifier is the identification of the channel end point associated with the remote user process. As shown in FIG. 3, the entry 302a has a local end point identifier (local EPID) 304a, a remote partition identifier (RPID) 306a, and a remote end point identifier (remote EPID) 308a. Similarly, the entries 302b and 302n have local EPIDs 304b and 304n, RPIDs 306b and 306n, and remote EPIDs 308b and 308n, respectively.

Channel Key Table

The channel management mechanisms store the channel keys created by the local kernel agents or other mechanisms and received from other channel management mechanisms, in a channel key table. FIG. 4 shows a channel key table 400 according to an embodiment of the invention. The channel key table 400 is preferably stored in and/or only accessible by a channel management mechanism. That is, the channel key table 400 is inaccessible by the user processes and the kernel agent. The channel key table 400 has entries 402a, 402b, . . . , 402n, that correspond to the entries 302a, 302b, . . . , 302n of the channel state table 300 of FIG. 3. Each key table entry includes at least a channel key associated with a desired secure channel identified by an entry of the channel state table. For instance, the entries 402a, 402b, . . . , 402n store the channel keys 404a, 404b, . . . , 404n.

The channel key table 400 is used to provide for secure communication among user processes of different nodes. When a user process of a node wishes to authorize communication from another user process, it requests the kernel agent to create a channel key, and to pass the key to a communication management mechanism, which stores the key in an appropriate entry of the table 400. Furthermore, when the communication management mechanism receives a secure connection request from another communication management mechanism, it stores the channel key received in the request in an appropriate entry of the table 400.

Once a secure channel to a first user process from a second user process has been established, the second process sends a message to the first process through its communication management mechanism, such as via a kernel agent. The mechanism attaches the channel key corresponding to the secure channel to the message, and sends it to the communication management mechanism for the first process for routing to the first process. This mechanism verifies the channel key with the key it previously stored in the table 400 before it routes the message to the first process, such as via a kernal agent.

Once the connection management mechanism of a node accepts and processes a request from a local kernel agent to store a key in the channel key table, an exception is generated when a remote node then attempts to modify the key in that entry. Similarly, once the mechanism accepts and processes a request from a remote node to store a key in the table, an exception is generated when a local kernel agent attempts to modify the key in that entry. There thus can be a flag in the each entry of the channel key table, so that the mechanism is able to determine whether the entry has already been set by either the local kernel agent or the remote node. This flag is referred to as a valid flag, or bit, and acts as an exclusion mechanism.

Method

Figure 5:
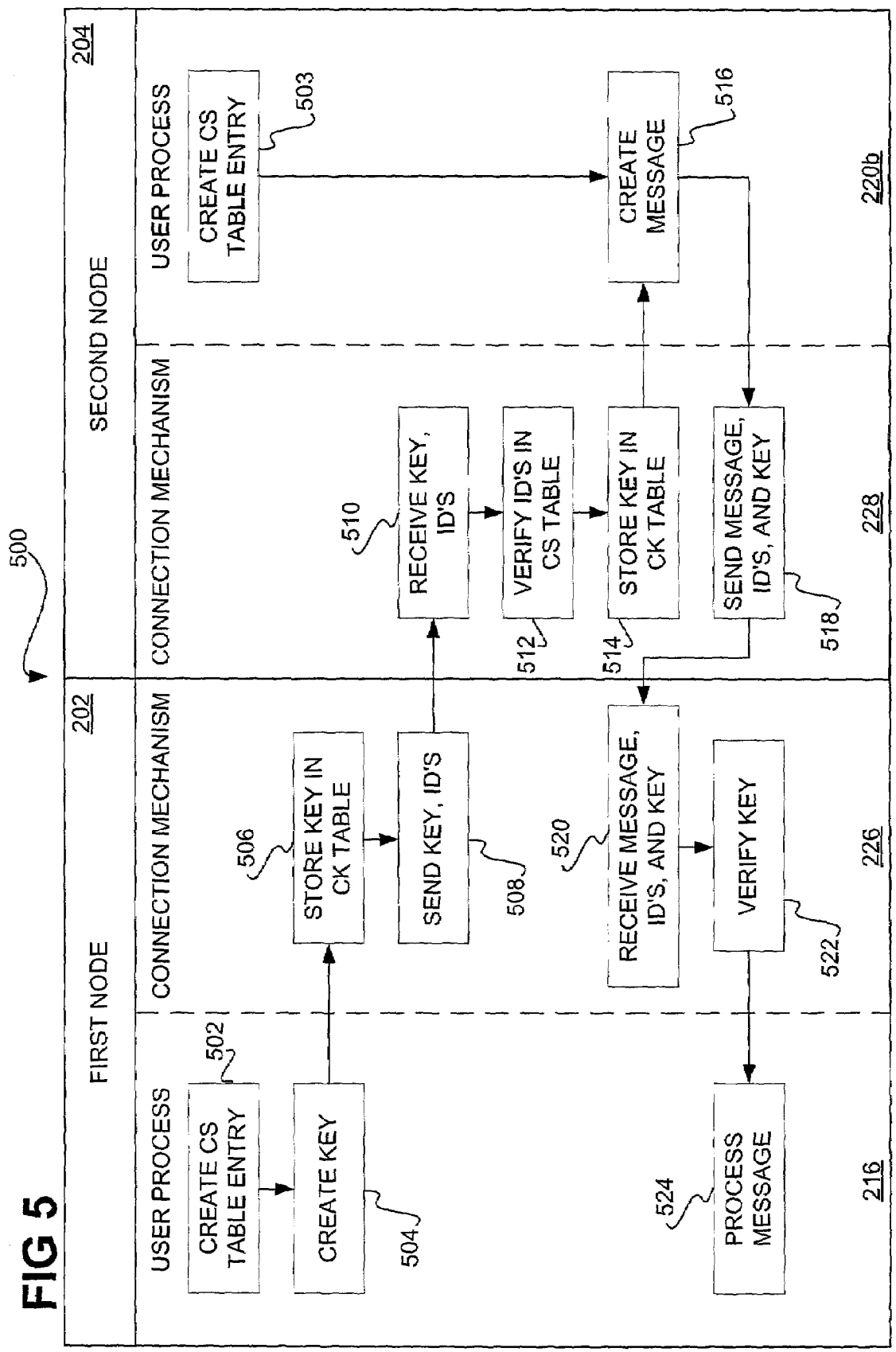
FIG. 5 is a flowchart of a method according to a specific embodiment of the invention and that is consistent with the method of FIG. 1.

FIG. 5 is a flowchart of a method 500 according to a specific embodiment of the invention. The method 500 can be implemented in conjunction with the system 200 of FIG. 2 and the tables 300 and 400 of FIGS. 3 and 4, respectively. As with other embodiments of the invention, the method 500 can also be implemented in conjunction with an article of manufacture having a computer-readable signal-bearing medium. The medium may be a recordable data storage medium, a modulated carrier signal, or another type of medium. Furthermore, the method 500 is consistent with the method 100 of the preferred embodiment of the invention of FIG. 1.

The method 500 is shown in FIG. 5 as having its parts performed by the first node 202 and the second node 204. More specifically, the method 500 is depicted as having its parts performed by the user process 216 and the connection management mechanism 226 of the first node 202, and the connection management mechanism 228 and the user process 220b of the second node 204. Like the system 200 of FIG. 2 of which the nodes 202 and 204 are a part, the method 500 is amenable to implementations where there is only one node and one connection mechanism.

The method 500 is used for establishing a secure channel and transmitting messages within the secure channel from the user process 220b of the second node 204 to the user process 216 of the first node 202. A kernel agent creates a channel state table entry on behalf of the user process 216 (502), and another kernel agent creates a channel state table entry on behalf of the user process 220b (503). The channel state table entry created for user process 216 includes identification of the kernel agent, the identification of the partition 218a of FIG. 2 in which the user process 220b is running, and the identification of the user process 220b. The channel state table entry created for the user process 220b includes identification of the other kernel agent, the identification of the partition 208d of FIG. 2 in which the user process 216 is running, and the identification of the user process 216.

Next, the kernel agent, for the user process 216, creates a channel key (504), which the connection management mechanism 226 stores in its channel key table (506).The mechanism 226 stores the channel key in an entry of the channel key table that corresponds to the channel state table entry created by the kernel agent on behalf of the user process 216. The mechanism 226 sends the channel key, along with the identifications of the partition 208d of FIG. 2 and the kernel agent (user processes) 216 and 220b, to the connection management mechanism 228 (508). The transmission of this information is part of a connection request by the user process 216 to establish a virtual secure communication channel to receive messages from the user process 220b. The mechanism 228 then receives the key and the identifications from the connection management mechanism 226 (510).

The connection management mechanism 226 verifies the identifications of the partition 208d of FIG. 2 and the user processes 216 and 220b against those in the channel state table entry previously created by the user process 220b (512). Verification is performed so that the mechanism 228 is able to confirm that the connection request received from the connection management mechanism 226 corresponds to a request that has been authorized by the user process 220b. Once verification has been performed, and assuming that the verification was acceptable, the mechanism 228 stores the received key in an entry its channel key table corresponding to the channel state table entry previously created by the process 220b (514).

The secure communication channel from the user process 220b to the user process 216 has thus been established, and the user process 220b is able to send messages securely to the user process 216. This is accomplished as follows. The user process 220b first creates a desired message (516), and passes it to the connection management mechanism 228. The connection mechanism 228 sends the message, along with the identifications of the user processes 220b and 216 and of the partition 218a of FIG. 2, and the key previously stored in its channel key table, to the connection management mechanism 226 (518). The connection mechanism 226 receives the message, the identifications, and the key (520). The mechanism 226 verifies the key against the key previously stored in its channel key table for the channel state table entry corresponding to the identifications received (522). Verification is performed so that the mechanism 226 is able to confirm that the message was sent by a previously authorized user process. Once verification has been performed, and assuming that it was successful, the mechanism 226 passes the message to the user process 216, which processes the message (524).

Advantages Over the Prior Art

Embodiments of the invention allow for advantages over the prior art. The use of a channel key stored in hardware and that is preferably inaccessible to user processes largely prevents unauthorized messages being received from corrupt or malicious user processes. The connection management mechanism is a secure hardware that maintains the security of the virtual communication channels between user processes. Because the user processes themselves do not have access to the channel keys, corrupt or malicious processes cannot send unauthorized messages that are received by other processes. The invention provides for this security without the need of a hypervisor. For servers that nevertheless employ a hypervisor, this means that the hypervisor is not burdened with management of secure virtual communication channels, potentially increasing communication performance. For servers that do not or cannot employ a hypervisor, this means that secure channels are nevertheless possible as provided for by the invention.

ALTERNATIVE EMBODIMENTS

It will be appreciated that, although specific embodiments of the invention have been described herein for purposes of illustration, various modifications may be made without departing from the spirit and scope of the invention. For instance, whereas the invention has been substantially described in relation to nodes that are servers and that have partitions in which user processes are running, the invention itself is applicable to other types of nodes. As another example, whereas the invention has been substantially described in relation to user processes and connection management mechanisms, the invention itself is applicable to other types of software and hardware. For instance, besides user processes, the invention is also applicable to other types of processes, such as kernel processes. Accordingly, the scope of protection of this invention is limited only by the following claims and their equivalents.

We claim:

1. A method for establishing a secure transmission channel from a user process running on a first partition of a first node partitioned into a plurality of partitions including the first partition, each partition having a corresponding operating system instance such that each partition is a separate virtual computer running on the first node, to a user process running on a second partition of a second node partitioned into a plurality of partitions including the second partition, each partition having a corresponding operating system instance such that each partition is a separate virtual computer running on the second node, the method comprising:

sending a key, identification of the first partition of the first node, and identification of the second partition of the second node from hardware of the first node to hardware of the second node, such that the key is inaccessible by all user processes running on the first node, in that none of the user processes are able to access the key, and unauthorized processes running on the first node are unable to send unauthorized messages through the hardware of the first node;

receiving the key, identification of the first partition of the first node, and identification of the second partition of the second node by the hardware of the second node;

verifying the identification of the first partition of the first node and the identification of the second partition of the second node by the hardware of the second node; and, storing the key at the hardware of the second node, such that the key is inaccessible by all user processes running on the second node, in that none of the user processes are able to access the key, wherein the hardware of the first hardware and the hardware of the second node establish a channel over which the user process running on the first partition of the first node and the user process running on the second partition of the second node are able to communicate, and wherein the first and the second nodes are the same node.

2. The method of claim 1, wherein each of the hardware of the first node and the hardware of the second node comprises a connection management mechanism.

3. The method of claim 1, wherein verifying the identification of the first partition of the first node and the identification of the second partition of the second node by the hardware of the second node comprises verifying the identification of the first partition of the first node and the identification of the second partition of the second node in a channel state table accessible by the hardware of the second node and inaccessible by all the user processes of the second node, in that none of the user processes are able to access the channel state table.

4. The method of claim 1, further comprising:

creating a message at the user process running on the second partition of the second node;

sending the message, the key, the identification of the first partition of the first node, and the identification of the second partition of the second node from the hardware of the second node to the hardware of the first node;

receiving the message, the key, the identification of the first partition of the first node, and the identification of the second partition of the second node by the hardware of the first node;

verifying the key at the hardware of the first node; and, processing the message at the user process of the first node, where the key has been successfully verified at the hardware of the first node.

5. A computerized system comprising:

a plurality of nodes, each node having a plurality of partitions, each partition having a corresponding operating system instance such that the partition is a separate virtual computer running on the node, each partition having a plurality of user processes running thereon within the corresponding operating system instance of the partition;

a first secure connection management hardware mechanism at a first node of the plurality of nodes to maintain first keys for secure communication to first user processes running on the partitions of the first node from second user processes running on the partitions of a second node of the plurality of nodes, the first keys inaccessible by all user processes running on the partitions of the first node and running on the partitions of the second node in that none of the user processes are able to access the first keys, each first key used for secure communication to one of the first processes from one of the second user processes, and unauthorized processes running on the first node are unable to send unauthorized messages through the first secure connection management hardware of the first node; and, a second secure connection management hardware mechanism at the second node to maintain second keys for secure communication to the second user processes from the first user processes, the second keys inaccessible by all user processes running on the partitions of the first node and running on the partitions of the second node in that none of the user processes are able to access the second keys, each second key used for secure communication to one of the second user processes from one of the first user processes, wherein the first and the second secure connection management hardware mechanisms establish a channel over which the first user processes and the second user processes are able to communicate, and wherein the first and the second nodes are the same node.

6. The system of claim 5, further comprising:

a first key table at the first node to store the first keys, the first key table accessible by the first secure connection management hardware mechanism but inaccessible by the first user processes in that none of the first user processes are able to access the first key table; and, a second key table at the second node to store the second keys, the second key table accessible by the second secure connection management hardware mechanism but inaccessible by the second user processes in that none of the second user processes are able to access the second key table.

7. The system of claim 5, further comprising:

a first connection table at the first node and accessible by the first secure connection management hardware mechanism and the first user processes, the first connection table having a number of first entries, each first entry identifying one of the first user processes, one of the second user processes with which the one of the first user processes is securely communicating, and one of the partitions of the second node in which the one of the second user processes is running; and, a second connection table at the second node and accessible by the second secure connection management hardware mechanism and the second user processes, the second connection table having a number of second entries, each second entry identifying one of the second user processes, one of the first user processes with which the one of the second user processes is securely communicating, and one of the partitions of the first node in which the one of the first user processes is running.

8. The system of claim 7, further comprising:

a first key table at the first node having a number of first key entries, each first key entry corresponding to a first entry of the first connection table and storing one of the first keys, the first key table accessible by the first secure connection management hardware mechanism but inaccessible by the first user processes in that none of the first user processes are able to access the first key table; and, a second key table at the second node having a number of second key entries, each second key entry corresponding to a second entry of the second connection table and storing one of the second keys, the second key table accessible by the second secure connection management hardware mechanism but inaccessible by the second user processes in that none of the second user processes are able to access the second key table.

9. An article comprising:

a computer-readable recordable data storage medium; and, means in the medium for maintaining keys for secure communication to first processes running in a plurality of partitions of a first node from second processes running in a plurality of partitions of a second node, each partition having a corresponding operating system instance such that each partition is a separate virtual computer, the keys inaccessible by all user processes in that none of the user processes are able to access the keys, each key used for secure communication to one of the first user processes from one of the second user processes, wherein unauthorized processes are unable to send unauthorized messages, and wherein the first and the second nodes are the same node.

10. The article of claim 9, wherein the means in the medium is further for storing the keys in a key table inaccessible by all the user processes in that none of the user processes are able to access the key table.

11. The article of claim 9, wherein a connection table at the first node is accessible by the means in the medium and the first user processes, the connection table having a number of entries, each entry identifying one of the first user processes, one of the second user processes with which the one of the first processes is securely communicating, and one of the partitions of the second node in which the one of the second user processes is running.

12. The article of claim 11, wherein a key table at the first node is accessible by the means in the medium but inaccessible by the first user processes in that none of the first user processes is able to access the key table, the key table having a number of key entries, each key entry corresponding to an entry of the connection table and storing one of the keys.

* * * * *